US008553280B2

United States Patent
Hoover et al.

(10) Patent No.: US 8,553,280 B2
(45) Date of Patent: Oct. 8, 2013

(54) IMAGE ON PAPER REGISTRATION USING IMAGE MARKS

(75) Inventors: Martin Edward Hoover, Rochester, NY (US); Jack Gaynor Elliot, Penfield, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 821 days.

(21) Appl. No.: 12/608,336

(22) Filed: Oct. 29, 2009

(65) Prior Publication Data

US 2011/0102817 A1    May 5, 2011

(51) Int. Cl.
*H04N 1/46*    (2006.01)
*H04N 1/00*    (2006.01)
*G06K 9/36*    (2006.01)
*G03G 15/00*    (2006.01)
*G01D 15/06*    (2006.01)
*B41J 29/38*    (2006.01)
*B41J 2/01*    (2006.01)

(52) U.S. Cl.
USPC ............ 358/1.9; 358/504; 358/406; 382/287; 382/289; 399/9; 399/15; 399/159; 397/116; 397/14; 397/1

(58) Field of Classification Search
USPC ............ 358/1.15, 1.9, 504, 406; 347/14, 116; 399/159
See application file for complete search history.

(56) References Cited

U.S. PATENT DOCUMENTS

| | | | |
|---|---|---|---|
| 5,710,751 A * | 1/1998 | Hoover et al. | 369/97 |
| 6,373,042 B1 | 4/2002 | Kretschmann et al. | |
| 6,525,751 B2 * | 2/2003 | Hoover | 347/116 |
| 7,106,477 B2 * | 9/2006 | Horobin | 358/1.9 |
| 7,420,719 B2 * | 9/2008 | Mongeon | 358/504 |
| 7,467,838 B2 * | 12/2008 | Folkins et al. | 347/14 |
| 2002/0175988 A1 * | 11/2002 | Hoover | 347/116 |
| 2003/0201598 A1 | 10/2003 | Walsh et al. | |
| 2008/0131166 A1 * | 6/2008 | Yokoyama et al. | 399/159 |
| 2008/0278735 A1 | 11/2008 | Wang et al. | |

\* cited by examiner

*Primary Examiner* — Akwasi M Sarpong
(74) *Attorney, Agent, or Firm* — Hoffmann & Baron, LLP

(57) ABSTRACT

An image transfer assembly and method capable of adjusting the registration of an image printed on paper. A first image location being determined on at least one first sheet by measuring for each of at least three corners of a first sheet the distance between the two adjoining edges of the respective corners to a portion of at least one first fiducial mark. For each of the measured first sheet corners the measured portion of the at least one first fiducial mark is closer to that respective corner than any other of the first sheet corners. Then a second image to be transferred is adjusted by changing, relative to at least one second sheet, at least one of a size, shear, position and orientation of the second image based on the determined first image location. The adjusted second image being then printed on the second sheet(s).

18 Claims, 7 Drawing Sheets

IMAGE ON PAPER REGISTRATION USING IMAGE MARKS

TECHNICAL FIELD

The presently disclosed technologies are directed to automatically adjusting the registration of an image transferred to sheets by measuring marks disposed in close proximity to sheet edges in an image transfer assembly, such as a printing system.

BACKGROUND

Accurate Image On Paper (IOP) registration is generally desirable to users and consumers in the printing and/or image reproduction industry. Single-side (also referred to as "simplex") IOP registration focuses on the location of image marks with respect to the edges of the paper. Also, double-sided (also referred to as duplex) or side 1 to side 2 IOP registration focuses on the location of image marks on side 2 with respect to corresponding image marks on side 1. The primary sources of simplex IOP registration error include the sheet registration module, the Raster Output Scanner (ROS) module, and the photoreceptor module. The precision and accuracy of these modules directly impact the simplex IOP registration. For duplex registration, in addition to the simplex sources, xerographic printers suffer from the shrinkage of paper during fusing. Basically, the paper is smaller when the duplex image is transferred than it was for the simplex image, effectively making the side 1 image smaller with respect to that of side 2. Also, there is significant variation in paper shrinkage within (sheet-to-sheet) and between different types of substrate media.

Contemporary setup procedures for IOP registration require calibration of image-on-paper (IOP) registration systems is often time consuming and cumbersome. Such procedures employ a separate image scanning device and a test pattern that includes a 2D grid of dots (a pattern of marks) on a central portion of a test sheet. For duplex registration the grid of dots is included on each side of the test sheet. The test pattern is scanned and the resulting image is processed to find the macroscopic location of the entire image with respect to two edges (a single corner) of the paper as well as the linear and non-linear magnification errors within the image. Such methods require the scanning device to be very precise and consistent (repeatable). Also those methods requires a calibration reference pattern to remove accuracy errors in the scan area. Accordingly, such contemporary methods do not lend themselves to an inline sheet fed image scanning device. Instead, the motion quality and controlled environment of an offline flatbed image scanning device is required to meet the required measurement precision and accuracy.

Measurements of an absolute IOP registration across a print, especially a large print, are prone to errors caused by the image scanning device measuring across long distances of the prints. Using a flatbed document scanner, a test pattern is measured with respect to a reference frame established at a single corner of the test paper and aligned with one of the edges of the print. Measurements are made across the large span of the print with the farthest being near the opposite corner of the print, relative to the reference corner. Often, this can be a very long distance considering some printers print onto 14.33"×22.5" sheets. Positional errors in the scanned image (the test pattern) accumulate over long distances such that the errors in positional or location measurements using the scanned image are as significant as the errors in the test prints. Thus, in order to measure absolute locations over long spans such systems require a precision scanning device, such as a very repeatable flatbed scanner, and some calibration reference target that works to compensate or calibrate out the positional measurement errors across the two dimensional scan area.

Accordingly, it would be desirable to provide a system and/or method which can adjust the registration of an image transferred to sheets in an image transfer assembly, which overcomes the shortcoming of the prior art. In particular, a system and/or method that can adjust an image size, image shear, image target position and/or image target orientation of a transfer image based on an accurate scan of a preliminary image on a sheet.

SUMMARY

According to aspects described herein, there is disclosed a method of adjusting the registration of an image printed on sheets in a marking device, such as an image transfer assembly. The sheets each include at least four separate corners defining a periphery thereof. Each sheet corner defined by two adjoining sheet edges. The method includes determining a first image location on at least one first sheet by measuring for each of at least three corners of each first sheet the distance between the two adjoining edges of the respective at least three first sheet corners to a portion of at least one first printed fiducial mark. The measurement being obtained from an image sensing device. For each of the at least three first sheet corners the measured portion of the at least one first printed fiducial mark is closer to that respective corner than any other of the first sheet corners. The method adjusts a second image to be transferred or printed by changing, relative to at least one second sheet, at least one of a size, shear, position and orientation of the second image based on the determined first image location. The method also prints the adjusted second image to the at least one second sheet.

The fiducial marks can be part of the first, second or subsequent images. Also, the printed fiducial marks can represent an image apart from the first or second image. Further, the first and second images can be the same or similar. For example, the second image can differ from the first image in that the second image does not include fiducial marks. Additionally, the method can adjust the second image position by centering the second image on the at least one second sheet. The adjustment of the second image can alternatively include positioning the second image on the second sheet relative to at least one of the second sheet corners. The adjustment of the second image can further alternatively include scaling the second image. Such scaling can conform the second image to fit predefined margins of the second sheet. The method can also include printing the first image to the first sheet before determine the first image location.

Further, the method can include determining a third image location on a second side of the at least one first sheet by measuring for each of at least three corners of the first sheet the distance between the two adjoining edges of the respective at least three second sheet corners to a portion of at least one second printed fiducial mark. The measurement can be obtained from an image sensing device. For each of the at least three first sheet corners the measured portion of the at least one second printed fiducial mark is closer to that respective corner than any other of the first sheet corners. The method can include adjusting a fourth image to be printed by changing, relative to a second side of at least one second sheet, at least one of a size, position and orientation of the fourth image based on the determined third image location.

The method can also include printing the adjusted fourth image to the second side of the at least one second sheet.

The adjustment of the fourth image can specifically include scaling the fourth image to match the size of the adjusted second image after it is secured to the at least one second sheet. The at least one first printed fiducial mark can include more than one first fiducial mark, wherein each of the more than one first printed fiducial marks is spaced apart from each other. Each of the more than one first printed fiducial marks being closest to a different corner of the second sheet. The at least one first printed fiducial mark can include one continuous fiducial mark, wherein different portions of the one continuous fiducial mark are used to determine the first image location.

According to other aspects described herein, there is provided a system for adjusting the registration of an image printed on sheets with a marking device. The sheets used in such a system each include at least four separate corners defining a periphery thereof. Each sheet corner is defined by two adjoining sheet edges. The system includes an image sensing device determining a first image location on a first sheet by measuring for each of at least three corners of each first sheet the distance between the two adjoining edges of the respective at least three first sheet corners to a portion of at least one first fiducial mark. For each of the at least three first sheet corners the measured portion of the at least one first fiducial mark is closer to that respective corner than any other of the first sheet corners. The system includes a controller for adjusting a second image to be transferred. The controller being operatively coupled to the image sensing device. The second image being adjusted by changing relative to a second sheet at least one of a size, shear, position and orientation of the second image based on the determined first image location. The system further including a print engine for generating the adjusted second image. The print engine being operatively coupled to the controller, wherein the adjusted second image is printed on at least one second sheet.

Further, the adjustment of the second image can specifically include centering the second image on the at least one second sheet. Also, the adjustment of the second image can alternatively or additionally include positioning the second image on the second sheet relative to at least one of the second sheet corners. Further, the adjustment of the second image can alternatively or additionally include scaling the second image to fit predefined margins of the second sheet. The print engine can transfer the first image to the first sheet before determine the first image location. The image sensing device can further determine a third image location on a second side of the first sheet by measuring for each of at least three corners of the first sheet the distance between the two adjoining edges of the respective at least three second sheet corners to a portion of at least one second fiducial mark. For each of the at least three first sheet corners the measured portion of the at least one second fiducial mark is closer to that respective corner than any other of the first sheet corners. The controller can adjust a fourth image to be printed by changing, relative to a second side of the second sheet, at least one of a size, shear, position and orientation of the fourth image based on the determined third image location. The print engine can generate the adjusted fourth image for printing the second side of the second sheet. The adjustment of the fourth image can include scaling the fourth image to fit predefined margins of the second sheet. The at least one first fiducial mark can include more than one first fiducial mark, wherein each of the more than one first fiducial marks is spaced apart from each other. Each of the more than one first fiducial marks can be closest to a different corner of the first sheet. The at least one first fiducial mark can include one continuous fiducial mark, wherein different portions of the one continuous fiducial mark are used to determine the locations of more than one sheet corner.

These and other aspects, objectives, features, and advantages of the disclosed technologies will become apparent from the following detailed description of illustrative embodiments thereof, which is to be read in connection with the accompanying drawings.

DETAILED DESCRIPTION

Figure 1:
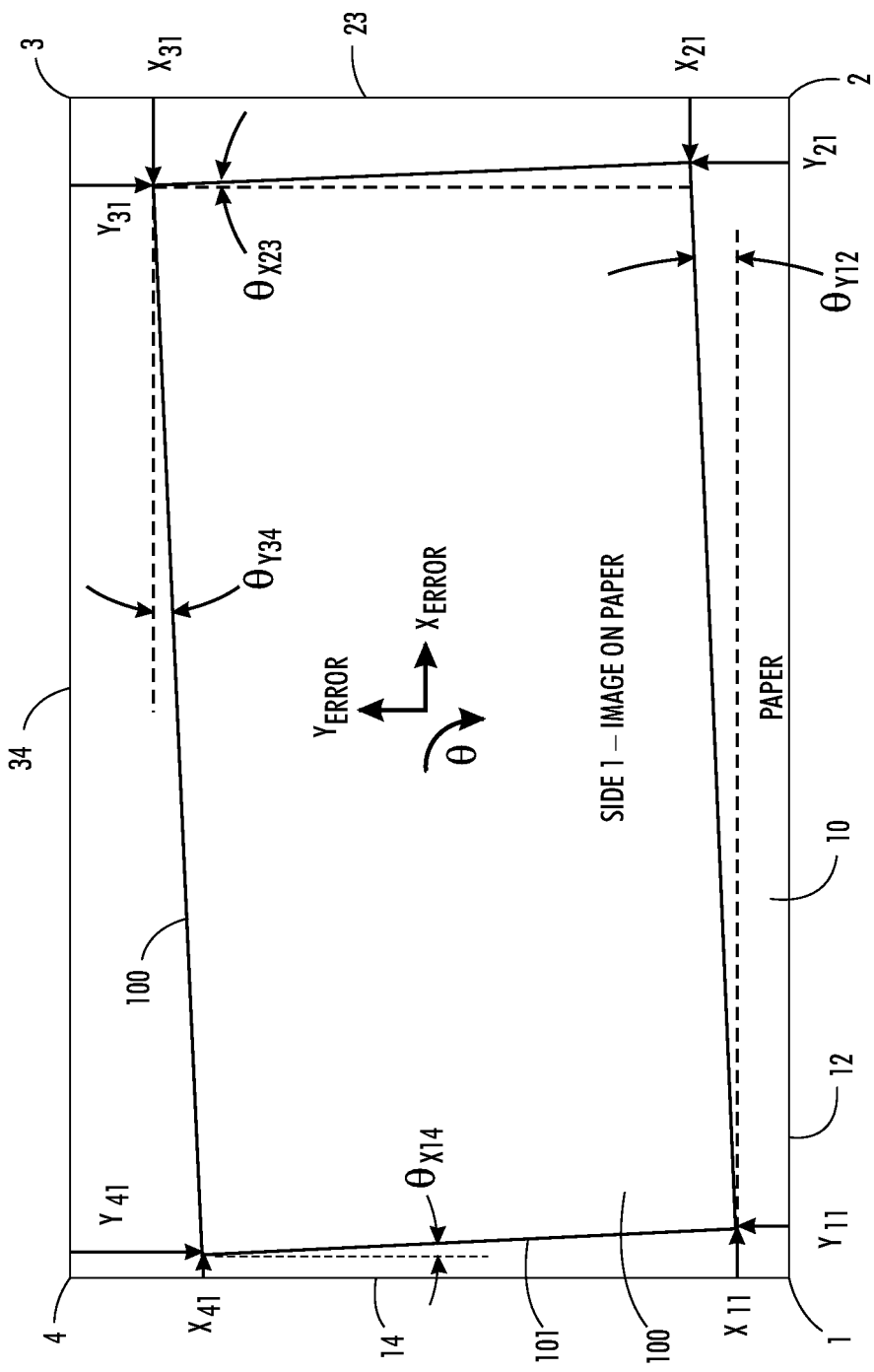
FIG. 1 is a schematic plan view of a sheet with a first fiducial mark thereon for adjusting the registration of a images transferred in a media handling assembly in accordance with an aspect of the disclosed technologies.

Describing now in further detail these exemplary embodiments with reference to the Figures. In accordance with aspects of the technologies disclosed herein, apparatus, systems and methods are disclosed for making adjustments needed to properly register images transferred to sheets. It should be understood that these apparatus, systems and methods can be used in one or more select locations of the paper path or paths of various conventional media handling assemblies. Thus, only a portion of an exemplary media handling assembly path are illustrated and discussed herein.

As used herein, a "printer," "printing assembly" or "printing system" refers to one or more devices used to generate "printouts" or a print outputting function, which refers to the reproduction of information on "substrate media" for any purpose. A "printer," "printing assembly" or "printing system" as used herein encompasses any apparatus, such as a digital copier, bookmaking machine, facsimile machine, multi-function machine, etc. which performs a print outputting function.

A printer, printing assembly or printing system as referred to herein are synonymous and can use an "electrostatographic process" to generate printouts, which refers to forming and using electrostatic charged patterns to record and reproduce information, a "xerographic process", which refers to the use of a resinous powder on an electrically charged plate record and reproduce information, or other suitable processes for generating printouts, such as an ink jet process, a liquid ink process, a solid ink process, and the like. Also, a printer can print and/or handle monochrome or color image data, as well as transfer or impress marks by indenting or raising a surface.

As used herein, "sheet" or "sheet of paper" refers to, for example, paper, transparencies, parchment, film, fabric, plastic, photo-finishing papers or other coated or non-coated substrate media in the form of a web upon which information or markings can be visualized and/or reproduced. While specific reference herein is made to a sheet or paper, it should be understood that any substrate media in the form of a web amounts to a reasonable equivalent thereto. Also, the "leading edge" of a substrate media refers to an edge of the sheet that is furthest downstream in the process direction.

As used herein, a "media handling assembly" refers to one or more devices used for handling and/or transporting a sheet, including feeding, printing, finishing, registration and transport systems.

As used herein, a "marking device" refers to one or more devices used to print, transfer and/or fix a mark onto a sheet, such as that used to form one or more images, marks, text or other indicia, such as electrophotography, iconography, magnetography or other re-imaging or marking processes. Such marking devices can include ink jet systems, image transfer assemblies that transfer one or more latent images or other systems that can apply one or more impressions.

As used herein, "sensor" refers to a device that responds to a physical stimulus and transmits a resulting impulse for the measurement and/or operation of controls. Such sensors include those that use pressure, light, motion, heat, sound and magnetism. Also, each of such sensors as refers to herein can include one or more point sensors and/or array sensors for detecting and/or measuring characteristics of a substrate media, such as speed, orientation, process or cross-process position and even the size of the substrate media. Thus, reference herein to a "sensor" can include more than one sensor.

As used herein, "skew" refers to a physical orientation of an image relative to the substrate media upon which it is affixed. In particular, skew refers to a misalignment, slant or oblique orientation of an edge of the substrate media relative to an image placed thereon.

As used herein an image position is distinguished from its location. The position of an image defines the place occupied on the sheet by the image and changes in position refer to one or more linear shifts of the image along the X-axis and/or the Y-axis, independent of any size, shear or orientation changes to the image. In contrast, the image location defines the particular space and/or boundaries occupied by the image. Thus, the image location includes all aspects of the image geometry such as image size, shear, orientation and position. The measurements described herein are intended to provide image location information.

As used herein, the terms "process" and "process direction" refer to a process of moving, transporting and/or handling a substrate media. The process direction is a flow path the substrate media moves in during the process. A "cross-process direction" is perpendicular to the process direction and generally extends parallel to the web of the substrate media.

As used herein, the term "fiducial mark" or "printed fiducial mark" refers to a designated point, line, mark or portion of an impression, mark or image disposed on a substrate media, used as a fixed basis of comparison. A fiducial mark is indicative of the location of a printing. Fiducial marks tend to be marks that have a shape that enables more accurate positional detection or measurement.

As used herein, the term "image sensing device", "image scanning device" or "scanner" refers to one or more devices using optics, sensors, photography or other hardware and software for detecting and/or measuring the intensities of one or more images or marks on a sheet, such as for a raster input device. Such devices can include scanners, cameras or other image sensing techniques.

It should be noted that the schematic drawings herein are not to scale. In fact, the distances between the fiducial marks and the sheet edges as well as the skew angle between the marks and the edges are exaggerated in order to more easily visualize and explain the methods, systems and apparatus in accordance with the disclosed technologies.

The methods herein can be used as part of a setup procedure for an image registration apparatus and/or system, such as in a printing assembly. Alternatively, the methods herein can be used continuously as part of an image registration system, in order to maintain and ensure accurate image placement. The methods measure a plurality of fiducial marks, or a plurality of portions of at least one continuous mark, that are in close proximity to the corners of a sheet of paper. Thus, the methods treat the measured sheet of paper as the reference for placement of the image and potential size, shear, position and/or orientation adjustments. By taking a plurality of measurements that span a relatively short distance across one or more sheets, this method relaxes the precision and accuracy traditionally required from an image sensing device. Also, using marks close to the edges significantly reduces positional measurement errors by avoiding measurements across large spans. Measuring only short distances is less sensitive to errors and can be used to tightly register image-on-paper (IOP) registration relative to the size of the paper, even in duplex printing. The measurements of fiducial marks can be used to adjust a transfer image before it is transferred to the measured sheet or subsequent sheets. Such adjustments can include centering the transfer image on the sheets, adjusting for shear in an image, registering the image relative to at least one sheet corner or changing the magnification of the image to accommodate predesignated sheet margins.

In accordance with an aspect of the disclosed technologies, non-linear magnification or distortion errors of the scanned fiducial mark need not be considered. For one thing, non-linear adjustment of an image to be transferred is not often available in image transfer systems. Additionally, non-linear errors are often dominated by linear errors.

Further, the methods described herein work well for users concerned mainly with where the transfer image is finally placed with respect to the sheet edges. For such users, an image on paper generally looks good as long as the image is centered and scaled properly with respect to the size of the paper. In other words, a print can look good to some, if its image is centered and scaled with respect to the size of the paper. Also, for duplex printing if the side 1 image is well aligned with the side 2 image. This is not to say the absolute image size does not matter. However, where absolute image size is important to the user, a supplemental procedure could be added to maintain that image size.

An aspect of the methods disclosed herein determines an image size (a linear magnification) of side 1 by measuring fiducial marks located on the paper and using the paper as the reference frame. Thereafter, a subsequent transfer image can be automatically scaled to fit the size of paper being used and even scaled relative to predefined margins. This aspect corresponds to applications where absolute image size is not the most significant factor determining image quality. Also, this aspect can assume that page distortions (non-linear magnification distortions) are either negligible or need not be considered in the IOP registration setup. What is included in the IOP setup herein is the placement of the side 1 image on the paper with respect to the edges and, if applicable, the size and placement of the back side image (side 2) relative to the front side image reference (side 1). Thus, regardless of whether the side 1 transfer image was scaled to fit the measured paper size or was maintained with an absolute image size, the side 2 image can be automatically scaled to match the size 1 image after it has been transferred and fused to the paper. Alternatively, an absolute image size can be maintained for the side 2 transfer image as well.

As shown in FIGS. 1-4, measurement of the location of a preliminary image 100 with respect the sheet of paper 10 is done using fiducial marks 101-104 next to the edges of a measured sheet. The preliminary or virtual image 100 need not be an actual image, although it can be, but at least represents an area bounded by the fiducial marks 101-104. The fiducial marks can be part of a larger image being placed on the sheets or separate therefrom. Alternatively, the preliminary image 100 can substantially consist of the fiducial marks 101-104, in which case the preliminary image 100 is synonymous with the fiducial marks. Regardless, in accordance with an aspect of the disclosed technologies, such marks, also referred to herein as fiducial marks, should be located in close proximity to the edges of the paper such that the location measurements are done over a relatively short distance.

Scanned images can easily have positional errors, such as spatial distortions that will accumulate into significant errors in positional measurements across longer lengths. The longer the distance, the larger the accumulated error. An aspect of the methods taught herein is to relax the error in locational or positional measurement by measuring as short a distance as is possible and/or practical. Another aspect of relaxation is to avoid the need to calibrate positional errors out of the scanned image. There are many types of spatial distortions commonly found in line scan images. How much error will accumulate depends on the nature of the spatial distortion. One of the most common and more problematic error types is an image magnification error or very low frequency errors.

For example, consider a scanner that has a magnification error of 1%. In other words rather than having the nominal spatial resolution of 600 dpi, the image has 1% magnification error which is equivalent to 606 dpi. Measuring a mark location relative to a paper edge across a distance of 1 inch, gives a an error in the positional measurement of 1%, which equates to ~254 microns. For IOP registration measurements with resolution accuracy in the 50 micron range, an error in the 250 micron range could be considered to great. Under that circumstance, a 1 inch measurement would be too far away with this large of a scanner magnification error. However, one must consider that there are tradeoffs between how much positional error there is in the image sensing/scanning method used and how far apart the marks are with respect to the edges. If the errors in the scan image are smaller, the proximity of the marks next to edges can be made larger and visa versa.

As a further example, consider a scan image positional or magnification error is less than 0.1%. Thus, the positional error accumulated across a 1 inch span is only about 25 microns, which can be considered an acceptable accuracy for measurement of IOP Registration. Nonetheless, 1 inch may still be quite a bit larger than needed for practical purposes. Most printers have the ability to print much closer to the edges of sheets. Another consideration could be extreme circumstances when IOP registration has not been setup at all. Under such circumstances the image may be misaligned by several millimeters such that the corner marks of the image fall off the edge of the paper. Accordingly, placing the marks less than 10 mm from the edges works well in accordance with various aspects of the disclosed technologies. Such a distance can be easily achieved and keeps the marks close to the edges. In this way, errors are minimized and/or the magnitude of the error in the scanned image that can be accommodated can be larger.

Figure 2:
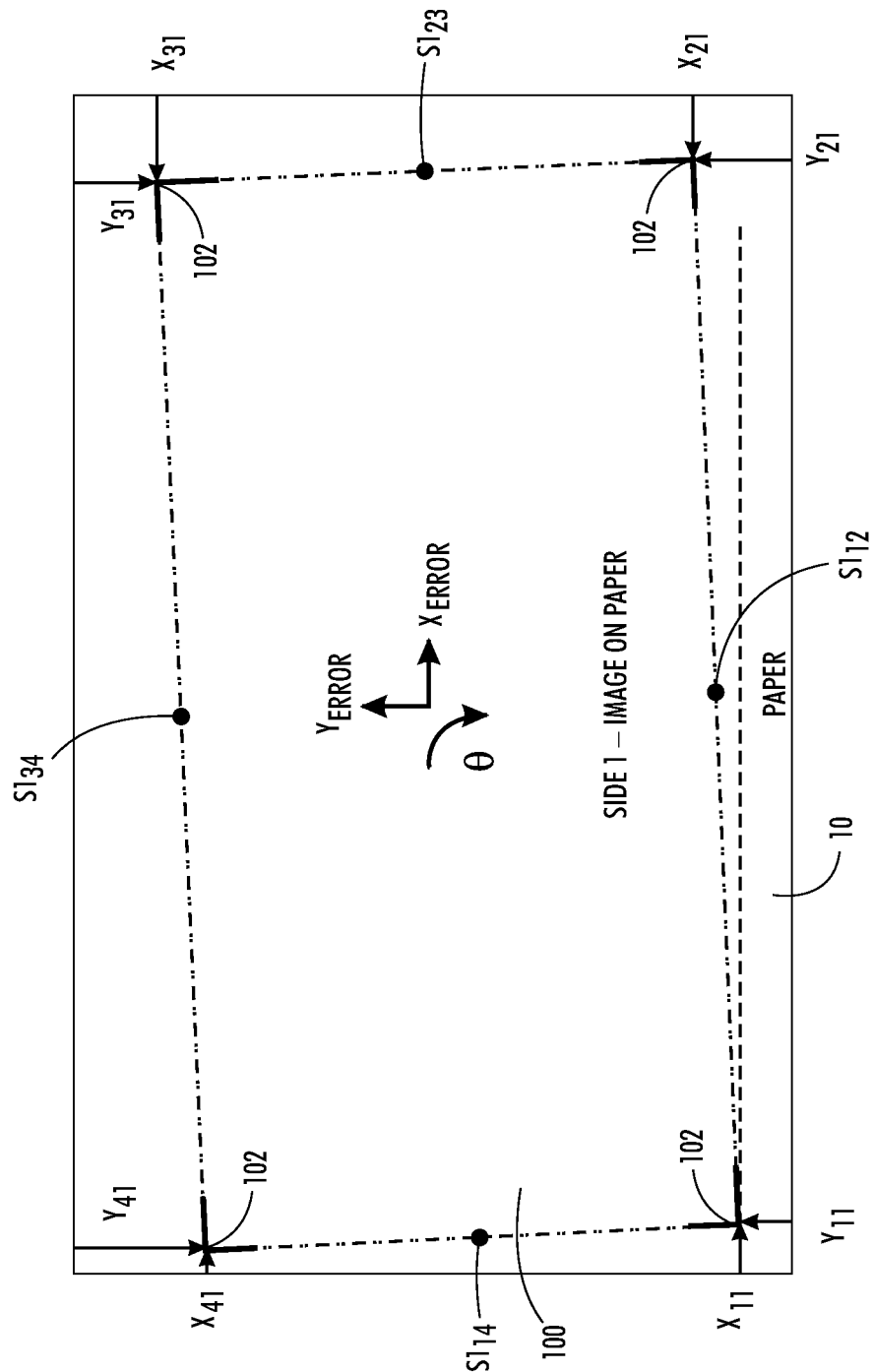
FIG. 2 is a schematic plan view of a sheet with a set of fiducial marks thereon for adjusting the registration of a images transferred in a media handling assembly in accordance with an aspect of the disclosed technologies.
Figure 3:
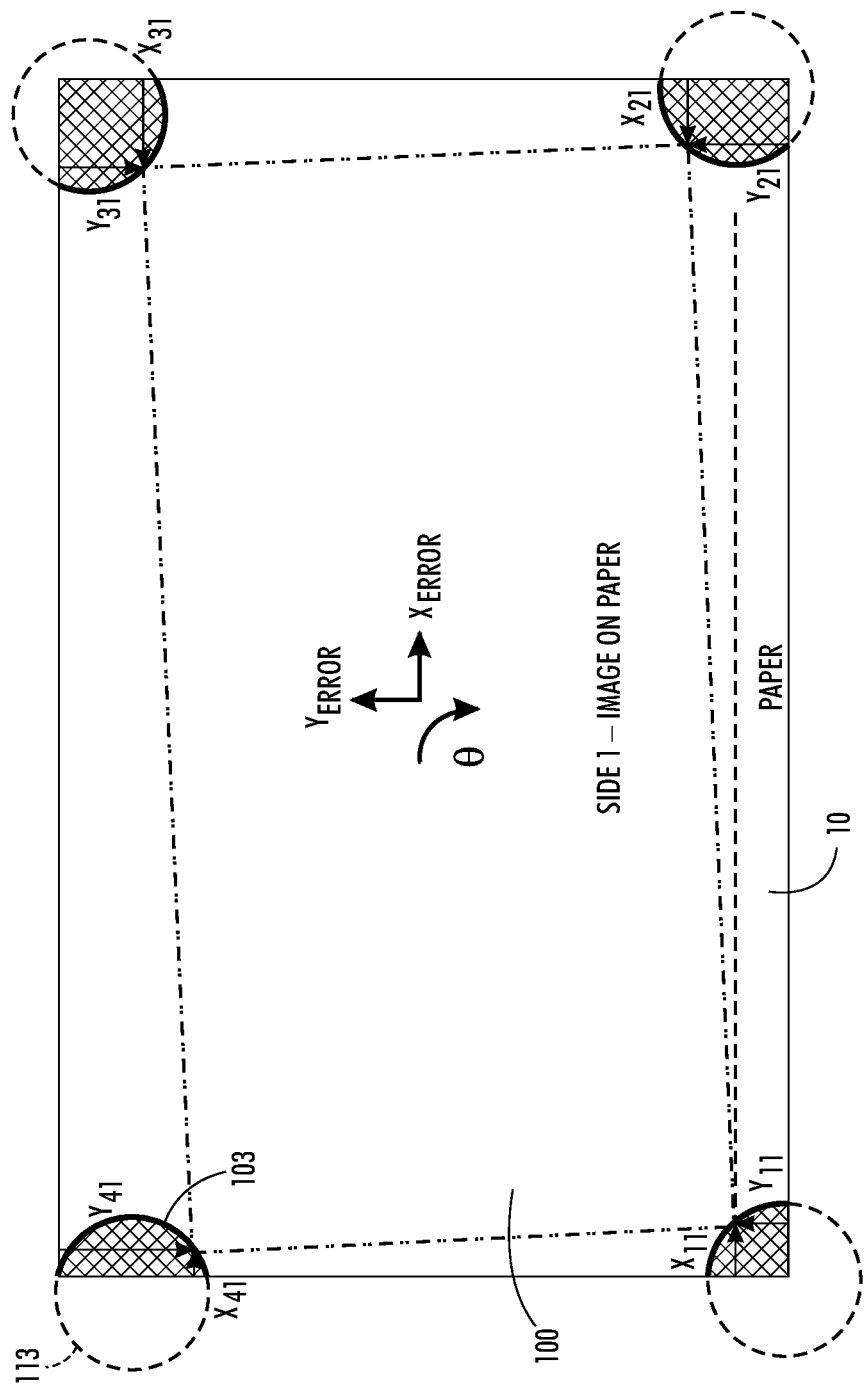
FIG. 3 is a schematic plan view of a sheet with another set of fiducial marks thereon for adjusting the registration of a images transferred in a media handling assembly in accordance with an aspect of the disclosed technologies.
Figure 4:
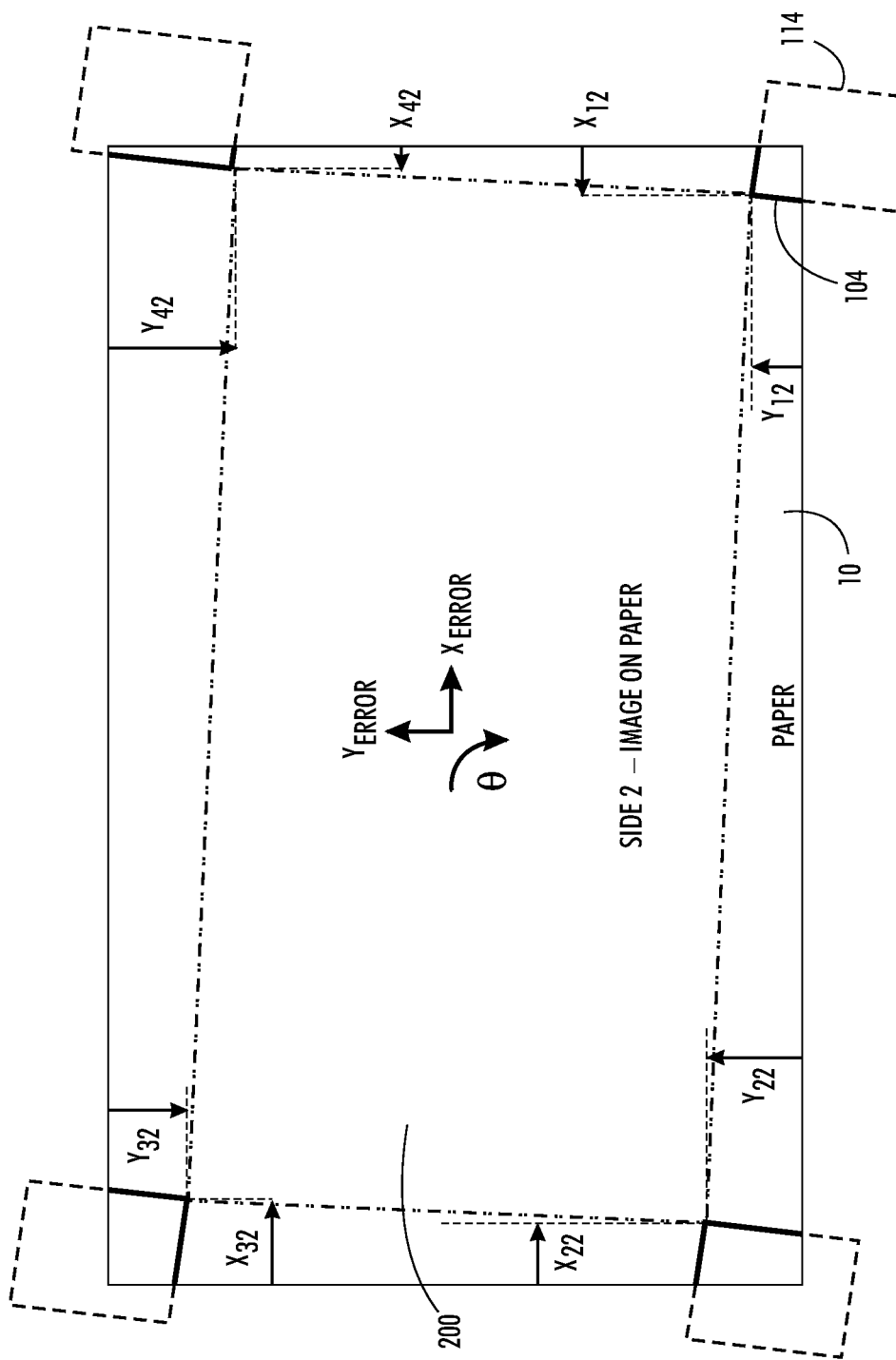
FIG. 4 is a schematic plan view of an opposed side of the sheet illustrated in FIG. 1, including a second fiducial mark thereon for adjusting the registration of a images transferred in a media handling assembly in accordance with an aspect of the disclosed technologies.

Just how close the fiducial marks are placed to the sheet edges, and particularly the corners, may be constrained by the printing system placing the marks on the sheets and the design of the marks themselves. The mark could be a square frame (lines) along the boarder of the 2D image (slightly smaller than the paper), as shown in FIG. 1. Alternatively, the marks could be as simple as crosshairs or L-shaped corner marks located near each of the 4 corners of the test print, as shown in FIG. 2. Also, the marks could consist of or include small circles or even bulls-eye designs (concentric circles), whose center can be found by an image processing system. As yet a further alternative, the marks could be predefined shapes that cover a portion of the corners of the test page, but include a portion of which lands beyond the test page, as shown in FIGS. 3 and 4. In the earlier illustrated examples in FIGS. 1 and 2, the closest portion of the marks relative to the nearest corner is measured with respect to the adjacent edges of the sheet. In the case where crosshairs or circles are used as the mark (not shown), a central portion of the mark (where the lines cross or the center of the circle) can be used as a reference point for measurements. In the example used with reference to FIGS. 3 and 4, an innermost edge or portion of the mark, relative to the sheet, is measured relative to the edges. In other words the farthest portion of each fiducial mark 103, 104 is measured relative to the nearest corners. Alternatively, an image processing system could determine the innermost portion of each fiducial mark 103, 104 from which to measure by calculating the points on which all corners of a virtual preliminary image 100 touch the marks, as shown in FIGS. 3 and 4.

It should be understood that the fiducial mark(s) 101-104 can be provided in a form that is not easily visible to the naked eye, but is visible to an image sensing device (for example using a yellow ink). Alternatively, the mark(s) 101-104 could be visible to the naked eye, but intended to be trimmed-off after the transfer image is fused to the sheet. Also, the marks may be intended to remain on the sheets for use in a later process.

FIG. 1 illustrates a schematic plan view of one side (side 1) of a sheet of paper 10 including a fiducial mark 101. Fiducial mark 101 is a frame or single continuous mark with its corners in close proximity to the sheet corners 1, 2, 3, 4. The corners of the mark 101 correspond to the measured outermost portions of the fiducial mark 101. Alternatively, the fiducial mark could represent the outer edges of an image that slightly fills or substantially fills the region inside the mark 101 (also referred to herein as the preliminary image 100). Regardless of the shape, size or configuration of the fiducial mark(s) used, reference points are predefined near at least three corners of the sheet, such that the measurements taken have a point of reference relative to the edges of the sheet. FIG. 2 shows a schematic plan view similar to FIG. 1, but using a set of fiducial marks 102 that define a preliminary image 100, similar to the area within mark 101 from FIG. 1. Such a set of fiducial marks 102 can be thought of as a single initial image on the sheet from which measurements are taken relative to the sheet edges.

FIGS. 3 and 4 show fiducial marks 103, 104 that are generated by transferring at least a portion of a set of marks 113, 114 onto the sheet. Thus, portions the marks 113, 114 get printed onto the sheet 10, while other portions correspond to the area beyond the sheet edges and thus do not get transferred onto the sheet 10. The portion of marks 113, 114 that end up on the sheet 10 form the fiducial marks 103, 104, while the rest of marks (indicated by dotted lines) get left behind on the transfer belt or drum carrying the sheet. In this way, the limited portions of marks 113, 114 that end-up on the sheet 10, form the fiducial mark 103, 104, which can be used for measurements. It should be understood that fiducial marks 113, 114 could be formed as other shapes (geometric or otherwise) as desired. Also, marks 113, 114 could alternatively be solid marks with their inner portions filled-in or shaded. As yet a further alternative, the marks 113, 114 could be formed by a series of marks, such that regardless of how many in the series did not land on the sheet, there would remain others in the series that did land on the sheet for locating the image.

In FIGS. 1 and 2 an outermost portion of the marks 101, 102 define a preliminary image 100, so the measurements extend for the sheet edges to the outer corners of the marks 101, 102. In contrast, in FIGS. 3 and 4 an innermost portion of the marks 103, 104 define the preliminary image 100. Thus, as noted in the upper left hand corner of FIG. 4, the distances from an innermost corner of the marks 103, 104 is measured relative to the adjacent sheet edges. These fiducial marks 101-104 representing the preliminary image 100 serve as a reference for subsequent images transferred to similar sheets. The dimensions and relative location of subsequent images transferred to the sheet or similar sheets should be known relative to at least the preliminary image 100.

In FIGS. 1-4 adjoining paper edges define each corner, such that edges 12, 14 form corner 1; edges 12, 23 form corner 2; edges 23, 34 form corner 3; and edges 14, 34 form corner 4. Thus, for each of at least three of the corners 1, 2, 3, 4, measurements are taken that determine the respective distances between the two adjoining sheet edges and a portion of the fiducial mark 100 closest to each corner 1, 2, 3, 4. Also, in order to ensure that the measured distances are a short distance relative to the size of the sheet, the measured portion of each mark is closer to their respective corner than any other corner.

Using the sheet as a reference frame, an X-axis and Y-axis can be defined. For example, a center point on the sheet can be designated as the origin of the X-Y coordinates. Alternatively, any other point, such as a sheet corner, could be the origin. Preferably, those axes extend respectively parallel and perpendicular to the sheet edges 12, 23, 34, 41. In this way, the measurements taken with regard to each corner determine a distance from a portion of the fiducial mark directly to the nearest two edge along both the X-axis and Y-axis. Thus in FIG. 1, for corner 1 on side 1 the shortest distances from the fiducial mark 101 to the closest sheet edges 12, 14 along the X-Y axis are represented by $X_{11}$ and $Y_{11}$. Similarly, for corners 2, 3, 4 the distances are represented by $X_{21}$ and $Y_{21}$; $X_{31}$ and $Y_{31}$; $X_{41}$ and $Y_{41}$, respectively. In this way, the first digit of the subscript denotes the corresponding sheet corner and the second digit denotes one of two planar sides of the sheet. Thus, as FIG. 4 illustrates side 2 of the sheet 10, the subscript for those distances all end in the number 2. Those distances can be correlated or associated with a common reference point, such as the center of the fiducial marks, the center of the sheet or any other point relative to the sheet or the mark(s).

The measurements provide a frame of reference between the sheet and the marks. That frame of reference can use the area bounded by the marks (the preliminary image 100) as an absolute image size, which can be known or input before hand. Thus, by knowing the absolute image size, the measurements will reveal the size of the sheet. Additionally, the measurements will quantify image shear, skew and/or image positioning along the axes. This will provide the system controller with the information about how much a subsequent transfer image needs to be adjusted in order to eliminate skew and position the transfer image as desired. Further, if the absolute image size is not going to be maintained for the transfer image, then the controller can use the measurements to adjust the image magnification (size), for example relative to the sheet size, with or without predesignated margins from the sheet edges, or a different image size.

It should be understood that throughout the embodiments disclosed herein that the measurements of less than all four corners, such as only three corners, can be used, while estimating the location of the non-measured corners based on the assumption that the sheet is rectangular. Alternatively, measurements from all four corners can be used in order to determine the sheet size and image configuration with more accuracy.

Several control objective can be achieved for IOP registration using the fiducial mark measurements described herein. The fiducial mark measurements can be used to adjust image size, image shear, image target location and image target orientation. Below is an exemplary formulaic calculation of IOP registration errors using fiducial marks next to adjacent edges at 4 corners of a print. The first formulaic examples use the sheet center as the axes origin and reference point for both sides 1 and 2, which can be used for centering the image on sheets. The below equations would be modified accordingly to accomplish different control objectives, including different location parameters. Thus, predesignated margins from two edges could be used or the image(s) could be located relative to a different reference point, like a corner. By varying the objectives, the below equations would be modified to use the alternative reference point(s), rather than the center point used in the equations below.

Side 1:

For the image to be centered along the X-axis, the sheet margins $M1_{14}$, $M1_{23}$ from edges 14 and 23 should be the same. Thus, using the measurements from the fiducial marks, an average measured image margin from edges 14 and 23, respectively, can be derived from the following:

$$S1_{14}=(X_{11}+X_{41})/2 \tag{1a}$$

$$S1_{23}=(X_{21}+X_{31})/2 \tag{1b}$$

Thus, the deviation or error from the image being centered at least along the X-axis is calculated by determining half of the difference between the two measured margins, according to:

$$X_1 \text{ error}=(S1_{14}-S1_{23})/2$$

$$X_1 \text{ error}=(X_{11}+X_{41}-X_{21}-X_{31})/4 \tag{2}$$

Similarly, for the image to be centered along the Y-axis, an average measured image margin from edges 12 and 34, respectively, can be derived from the following:

$$S1_{12}=(Y_{11}+Y_{21})/2 \tag{3a}$$

$$S1_{34}=(Y_{31}+Y_{41})/2 \tag{3b}$$

Thus, the error from such centered image distances at least along the Y-axis is calculated according to:

$$Y_1 \text{ error}=(Y_{11}+Y_{21}-Y_{31}-X_{41})/4 \tag{4}$$

Another control objective might be to adjust or correct an image target orientation, such as to correct for image skew relative to the sheet. Thus, a skew angle θ can be calculated using the measurements along the X-axis or the Y-axis using any edge, according to the following:

$$\theta_{X23}=\tan^{-1}\{(X_{31}-X_{21})/H_I\} \tag{5a}$$

$$\theta_{X14} = \tan^{-1}\{(X_{11}-X_{41})/H_I\} \quad (5b);$$

$$\theta_{Y12} = \tan^{-1}\{(Y_{21}-Y_{11})/W_I\} \quad (5c);$$

$$\theta_{Y34} = \tan^{-1}\{(Y_{41}-Y_{31})/W_I\} \quad (5d).$$

Each of the above skew angles $\theta_{X23}$, $\theta_{X14}$, $\theta_{Y12}$, $\theta_{Y34}$, which are shown in FIG. 1, can individually be used to determine and correct for image skew.

Alternatively, an average skew angle $\theta$ using opposed parallel edges can be calculated for adjusting image orientation according to:

$$\theta_{X1} = (\theta_{X23}+\theta_{X14})/2$$

$$\theta_{X1} = \tan^{-1}\{(X_{31}-X_{21}+X_{11}-X_{41})/(2*H_I)\} \quad (6a); \text{ or}$$

$$\theta_{Y1} = (\theta_{Y12}+\theta_{Y34})/2$$

$$\theta_{Y1} = \tan^{-1}\{(Y_{21}-Y_{11}+Y_{41}-Y_{31})/(2*W_I)\} \quad (6b);$$

and then using small angle approximation, which assumes the $\tan^{-1}$ is insignificant, equations 6a, 6b yield the following:

$$\theta_{X1} = (X_{31}-X_{21}+X_{11}-X_{41})/(2*H_I) \quad (7a); \text{ or}$$

$$\theta_{Y1} = (Y_{21}-Y_{11}+Y_{41}-Y_{31})/(2*W_I) \quad (7b);$$

As a further alternative using all four edges, the skew angle is calculated according to:

$$\theta_{XY1} = (\theta_{X1}+\theta_{Y1})/2$$

which expands to:

$$\theta_{XY1} = (X_{31}-X_{21}+X_{11}-X_{41})/(4*H_I)+(Y_{21}-Y_{11}+Y_{41}-Y_{31})/(4*W_I) \quad (8).$$

Using fewer edges to calculate the skew angle will make the calculations less sensitive to errors in squareness. Such squareness errors can occur from ROS skew, which effectively causes a sheer in the printed image such that it becomes slightly trapezoidal, rather than square. The sheer is often one-dimensional, thus by measuring skew angle based on edges that are not skewed by the ROS skew, the calculations can still correct for other skew without considering the ROS skew. For example, if the ROS skew is creating a sheer angle with respect to the Y-axis, skew measurements can be derived using only the edges parallel to the X-axis, such that IOP registration is insensitive to the ROS skew error.

Alternatively, measurements of image sheer, such as ROS skew or the image not being square with respect to the sheet edges (assuming the sheet is rectangular) can be determined by taking the difference between equations 7a and 7b above. Using such image sheer determinations, a system actuator could be used to square the image and eliminate or minimize the sheer. In this way, the image is adjusted to compensate for measured image shear. However, if no such sheer adjustment is available yet image sheer is determined to exist, using a greater number of sheet edges for calculating the skew can help determine an average skew.

It should be noted that in equations above, $W_I$ and $H_I$ represent the width and height, respectively of the preliminary mark 100, which is defined by the area bounded by the measured portions of the marks. The dimensions $W_I$ and $H_I$ can be input or measured as an absolute image size, with $W_I$ extending substantially along the Y-axis and $H_I$ extending substantially along the X-axis. Accordingly, the above described measurements of the fiducial marks relative to the sheet edges can be used to keep the image magnification (size) unchanged. When maintaining an absolute image size, the measurements can be used to ensure proper image registration, such as image orientation (in terms of removing skew) and/or image positioning relative to some point on the sheet (such as the center or a corner).

In a duplex printing process, an aspect of the disclosed technologies can be used to measure fiducial marks on side 2, which as above can be used to adjust the image transferred to that side. Although measurements for sheet size were determined for side 1, shrinkage of the sheet can occur after fusing the image onto side 1. Also, the sheet size could have changed due to other modifications or alterations to the sheet prior to the side 2 image transfer step. Thus, below is an exemplary formulaic calculation of IOP registration errors for centering and/or orienting the side 2 image on the same sheet of paper as side 1.

Side 2: same as side 1, but measurements of the marks and the edges are taken from side 2.

Using the same methods as above, the following formulas should hold true for calculating the average X-axis margins:

$$S2_{14} = (X_{12}+X_{42})/2 \quad (9a);$$

$$S2_{23} = (X_{22}+X_{32})/2 \quad (9b).$$

The side 2, X-axis error from true center is calculated according to:

$$X_2 \text{ error} = (X_{12}+X_{42}-X_{22}-X_{32})/4 \quad (10).$$

Similarly, the Y-axis margin is determined by:

$$S2_{12} = (Y_{12}+Y_{22})/2 \quad (11a);$$

$$S2_{34} = (Y_{32}+Y_{42})/2 \quad (11b).$$

Thus, for side 2 the Y-axis error from true center is calculated according to:

$$Y_2 \text{ error} = (Y_{12}+Y_{22}-Y_{32}-X_{42})/4 \quad (12).$$

Further, as above the skew angle $\theta$ can be calculated in accordance with formulas (5a-8), but using the side 2 measurements along the X-axis, the Y-axis and/or an average between both axes. As with side 1, an absolute image size can be maintained and formulas (5a)-(12) used to properly register the image, thereby adjusting the image orientation and/or location on the sheet.

Yet another control objective might be to adjust the image size. Thus, the transfer image can be scaled to fit a predefined sheet margin, based relative to the determined sheet size. In this way, by knowing the difference between the desired sheet margins and the above measurements, the image magnification (size), as well as the shear, orientation and location, can be adjusted to make the adjusted transfer image have the desired parameters. Alternatively, scaling can be performed to match the side 2 image to the size of the side 1 image, which may have experienced shrinkage after being fused onto side 1. Such shrinkage can occur when moisture is driven out of the paper during the fusing of the images from sides 1 and 2. Also, front to back magnification errors can come from machine setting or incorrect adjustments of predicted shrinkage. Thus, regardless of whether an absolute magnification was maintained or modified for the transfer image placed on side 1, the side 2 transfer image can be scaled as desired. When scaling the image transferred to side 2, a comparison can be made between the measurements from both sides of the sheet. As with side 1, the measurements for side 2 can be used to determine a new sheet size relative to the location of the fiducial marks.

Figure 5:
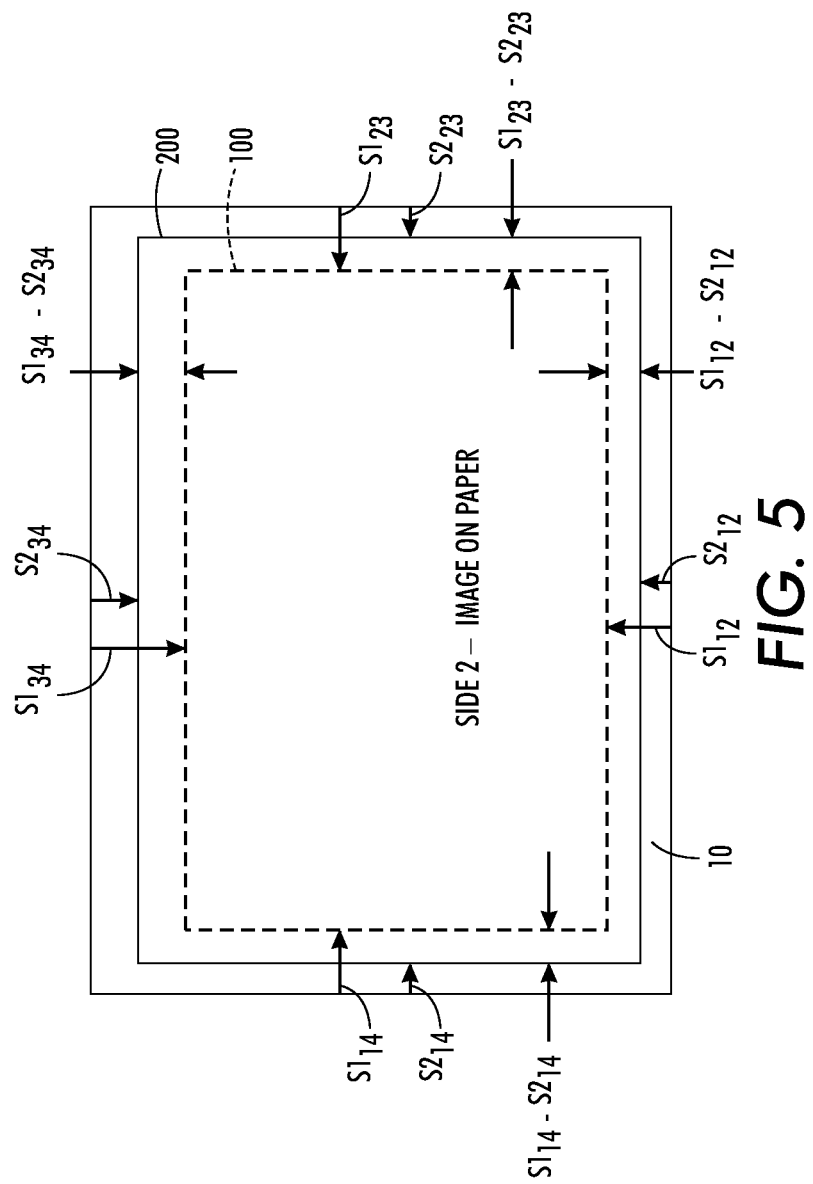
FIG. 5 is a schematic representation of an image magnification adjustment matching side 2 magnification to side 1 in accordance with an aspect of the disclosed technologies.

FIG. 5 illustrates a plan view of side 2 of sheet of paper 10, with a side 2 image 200 disposed thereon. A smaller image 100 (shown in dashed lines) is indicated from the other side of the sheet (side 1). The images 100, 200 from sides 1 and 2 in all the embodiments discloses herein can represent only fiducial marks, a larger test image or a combination of both. The side 1 image 100 could have changed size, during for example the fusing process, thus creating a disparity between the images of sides 1 and 2. The measurements of the fiducial marks relative to the sheet edges from both sides of the sheet can be used to directly calculate the necessary image magnification adjustment(s) needed to match the size of subsequently transferred images on both side 1 and side 2.

In accordance with an aspect of the disclosed technologies, the size adjustment needed to match the side 2 image 200 to that of the side 1 image 100 can be calculated using an averaging of sheet edge measurements from both sides. Error in the actual image dimensions in calculating the skew angle can be considered negligible. It can also be assumed that the skew angle is small such that the calculation of X and Y magnification adjustments are independent of the skew. As shown in FIG. 5, the distance $S1_{12}$ (as derived from formula 3a above) represents the average distance measured on side 1 from edge 12 (the bottom edge as shown in the drawings) along the Y-axis to the image (fiducial mark) 100. Similarly, for side 1 the distances $S1_{14}$, $S1_{23}$ and $S1_{34}$ can be calculated according to formulas 1a, 1b and 3b, respectively. Now applying the same methods for determining an average edge distance for side 2, the distances $S2_{12}$, $S2_{23}$, $S2_{34}$ and $S2_{14}$ can be represented as:

$$S2_{12}=\tfrac{1}{2}(Y_{12}+Y_{22});\quad(13)$$

$$S2_{23}=\tfrac{1}{2}(X_{22}+X_{32});\quad(14)$$

$$S2_{34}=\tfrac{1}{2}(Y_{32}+Y_{42});\text{ and}\quad(15)$$

$$S2_{14}=\tfrac{1}{2}(X_{12}+X_{42})\quad(16)$$

Thus, the cumulative measurements along the X-axis and the Y-axis can be compiled to represent the total change in size from side 1 to side 2 as follows:

$$X_{(side1-side2)}=(S1_{14}-S2_{14})+(S1_{23}-S2_{23});\quad(17)$$

$$Y_{(side1-side2)}=(S1_{12}-S2_{12})+(S1_{34}-S2_{34})\quad(18)$$

Alternatively, equations (17) and (18) can be represented as follows:

$$X_{(side1-side2)}=\tfrac{1}{2}[(X_{21}+X_{31}-X_{22}-X_{32})+(X_{11}+X_{41}-X_{12}-X_{42})]\quad(19)$$

$$Y_{(side1-side2)}\tfrac{1}{2}[(Y_{11}+Y_{21}-Y_{12}-Y_{22})+(Y_{41}+Y_{31}-Y_{42}-Y_{32})]\quad(20)$$

Above, $X_{(side1-side2)}$ and $Y_{(side1-side2)}$ represent the differences respectively, along the X-axis only and the Y-axis only, between the side 2 preliminary image 200 and the side 1 image 100. Accordingly, the measured difference along the X-axis is translated into a magnification adjustment, which can be used to scale the side 2 transfer image in the X-axis direction as follows.

$$X\text{mag}[\%]=[X_{(side1-side2)}/\text{Image}W]*100[\%]\quad(27)$$

Similarly, the measured difference along the Y-axis is translated into a relative magnification adjustment, which can be used to adjust the side 2 transfer image in the Y-axis direction as follows:

$$Y\text{mag}[\%]=[Y_{(side1-side2)}/\text{Image}H]*100[\%]\quad(28)$$

Figure 6:
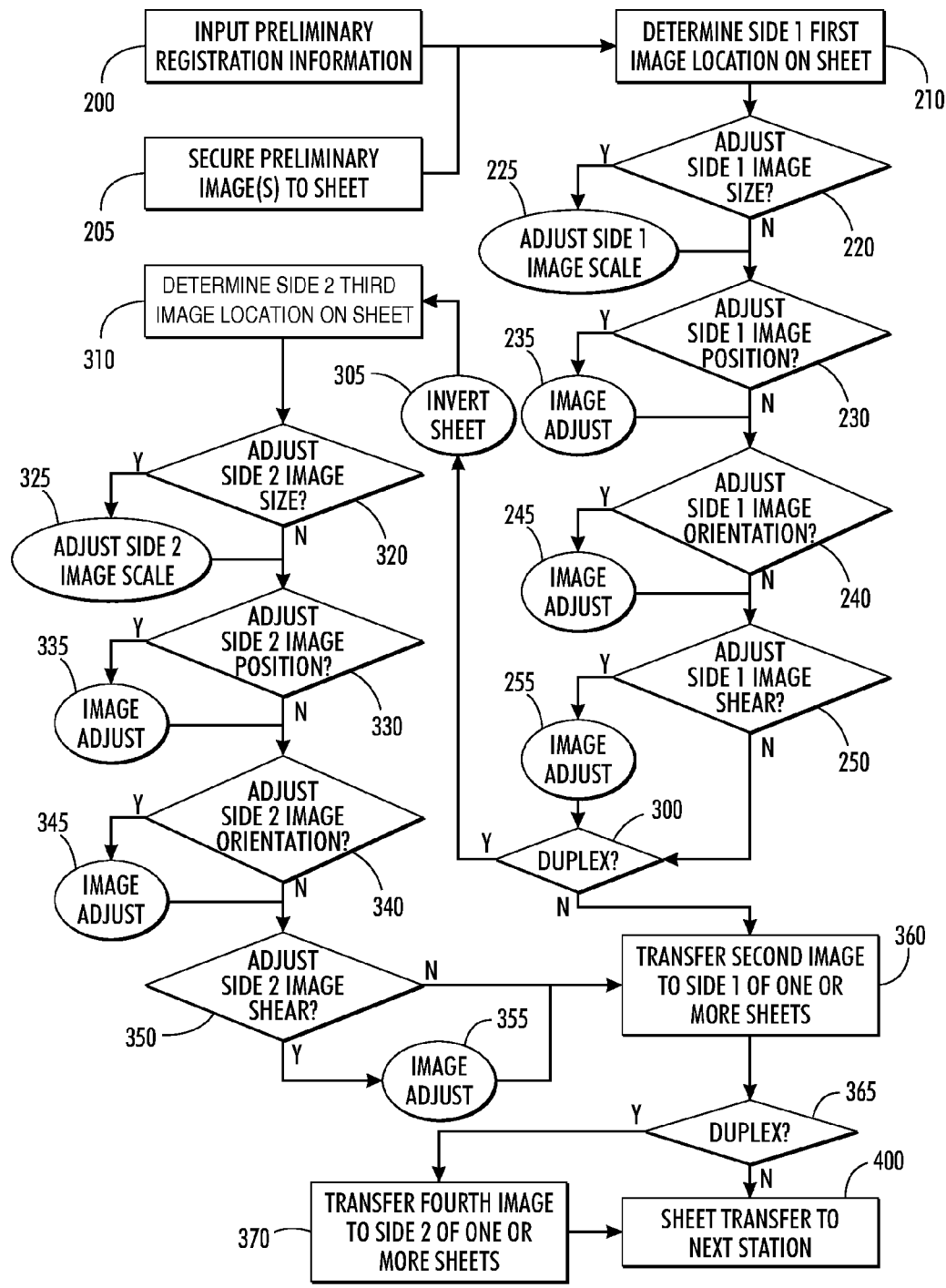
FIG. 6 is a flowchart outlining a method of adjusting the registration of an image in an image transfer assembly in accordance with aspects of the disclosed technologies.

FIG. 6 shows a flowchart outlining a method of adjusting the registration of an image in simplex or duplex image transfer systems. For reference purposes, the preliminary image 100 that includes at least one fiducial mark will be referred to as a first image. In accordance with the methods herein, measurements are taken of that first image relative to at least three of the sheet edges. The measurements of the first image are used to determine the location of the first image relative to the sheet. Such location information defines the outer boundaries of the first image and can be used to derive the size of the sheet as well as the image size, shear, location and orientation. Using the first image location, adjustments can be made so that further images transferred to subsequent sheets will be adjusted as desired. Such further images will be referred to herein as a second image. That second image may or may not include the fiducial marks and thus is characterized as a second image. However, it should be understood that the second image could be virtually the same as the first image, but for the adjustments made after measurements are taken. Nonetheless, it is the adjusted version of that second image that gets transferred to one or more subsequent sheets. In a duplex printing environment the second side of the sheet (side 2) will similarly be measured. Thus for clarity, the preliminary image on side 2 of the sheet is referred to herein as a third image. Accordingly, the subsequent image that gets adjusted and transferred to side 2 is referred to herein as the fourth image.

The methods disclosed herein can include certain aspects, such as the input of preliminary registration information 200 or the printing or securing of the preliminary image(s) on at least one sheet 205. If included, these steps 200, 205 can be performed in any order or can be performed at the same time. With regard to inputting the preliminary registration information 200, this information can indicate certain job parameters such as details regarding the dimensions or measuring points of the fiducial marks or what type of printing is desired, such as simplex/duplex, scaling or positioning parameters. Step 205 involves securing the preliminary image(s) to at least one test sheet. Thus, the first and third images can be printed onto sheets ahead of time, such as on pre-printed sheets designed to be used in the registration setup procedures herein. Alternatively, the first and/or third image(s) can be printed onto the sheet using the very print engine and system for which this procedure is used to calibrate and/or setup. In this way, a first one or two passes through the transfer station 50, shown in FIG. 7, could print the first and/or third image and a second one or two passes will scan the marks and perform further image transfers as described below.

FIG. 6 further shows that in step 210, the first image location on the sheet is determined. As described above, the determination of the image location entails the various measurements from at least three corners of the sheet to the respective portions of the fiducial marks. At this point, once that first image location is determined, preferably the controller will use the measurements to make appropriate adjustments to a second image which is intended to be transferred to the sheet. Thus, a series of steps 220-255 are included that to make those adjustments to the second image. It should be understood that the decision steps 220, 230, 240, 250 can be performed in a different order or simultaneously. Nonetheless, as adjustments to image size can impact all the other adjustments, there are advantages to performing step 220 before the others. Thereafter, in the case at step 220 that the absolute image size of the second image is being adjusted, the methods proceed to step 225 which adjusts the second image scale. However, if such absolute image size was input in the preliminary registration information 200 to remain unchanged, then the method would proceed to the next step 230, wherein the next decision is made regarding adjustment of the image location. If no image location adjustment needs to be made, the process can continue to step 240. Otherwise, the second image would be adjusted at 235 and proceed to step 240 to determine whether the second image orientation needs to be adjusted. Then if the image orientation needs to be adjusted, that would happen at step 245. Otherwise, the controller can make such orientation adjustments in step 245 and further proceed to step 250, to decide whether image shear needs to be adjusted. If no image shear adjustment needs to be made, the process proceeds to step 300. Otherwise, any image shear adjustments would happen at step 255 before proceeding to step 300. In a simplex (single sided) printing situation, the method can proceed from step 300 to step 360 where the adjusted second image is transferred to side 1 of one or more sheets, after which the sheets proceed to the next station 400. Otherwise, in a duplex printing situation step 300 will be answered in the affirmative and the process will proceed to step 305.

As with the simplex image registration determinations and adjustments noted above with regard to steps 210-255, similar procedures can be performed on the other side of the sheet for duplex printing. If duplex printing is being performed the method proceeds from step 300 to step 305 for sheet inversion (where the sheet gets flipped over). In an environment with image sensing devices disposed to scan both sides of the sheet, this sheet inversion step 305 could be ignored. Otherwise, once the sheet is inverted for the duplex process, the third image location is determined in step 310. Thereafter, determinations and adjustments to a fourth image are made in steps 320-355, similar to those made with respect to side 1. It should be understood that the determinations and adjustments with regard to side 2 can be and often are different from those made with regard to side 1. For example, an absolute image size can be maintained for the second image transferred to side 1, while scaling is performed for the fourth image transferred to side 2, in order to match the size of the second image and account for sheet shrinkage. Similarly, changes in polarity from side 1 to side 2 often dictate the adjustments be different. Accordingly, in step 320 a determination is made regarding the third image location on the second side of the sheet. Again, the determination in step 320 can be part of the preliminary registration information input in step 200, can be an automatic setting or can be based on other variables as desired. If the absolute image size is going to be maintained, the process can proceed to step 330 to decide whether the image location needs to be adjusted. Otherwise, if absolute image size is not being maintained, a scaling adjustment can be performed at step 325 and then proceed to step 330. Similarly, if the fourth image location does not need to be adjusted, the process can proceed to step 340 to decide whether orientation of the fourth image needs to be adjusted. Otherwise, the image can be adjusted in step 335 and then proceed to step 340. If the image orientation does not need to be adjusted, the process can proceed to step 350 do decide whether any shear in the fourth image needs to be adjusted. Otherwise, the image can be adjusted in step 355 before proceeding further. As above, it should be noted that the order of determination of the image location or orientation can be made changed and/or performed simultaneously as desired. Alternatively, the image adjustment steps 225, 235, 245, 255 on side 1, as well as the image adjustment steps 325, 335, 345, 355 on side 2 can be decided in almost any order depending on the nature of the printing.

In a duplex printing situation, once both sides have been measured and any necessary image adjustments have been determined and made, the adjusted second and fourth images can be transferred to subsequent sheets. Accordingly, the adjusted images are transferred in steps 360 and 370. In a simplex printing setup, the decision at step 365 is "no", so the method proceeds to step 400. However in duplex printing, after the second image is transferred 360, the decision at step 365 is "yes", so that the fourth image can be transferred to side 2 of the sheets. Thus, after the adjusted fourth image is transferred to side 2 of the one or more sheets, those sheets can be transferred to the next station at step 400. Such further stations could include further processing or a document delivery station such as sheet sorting or stacking trays.

Figure 7:
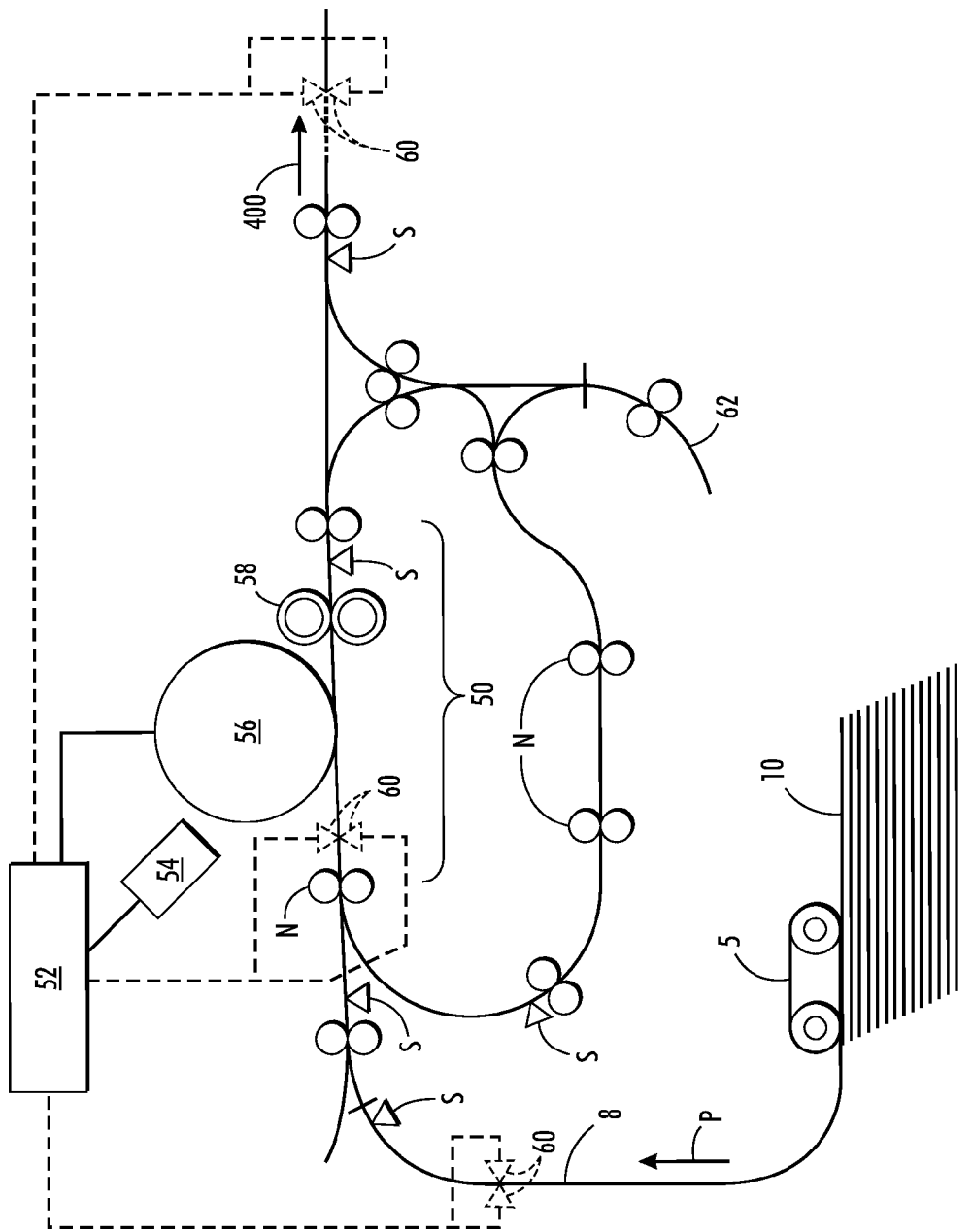
FIG. 7 is a schematic representation of marking device, including a duplex sheet handling path in accordance with an aspect of the disclosed technologies.

FIG. 7 shows a system in accordance with various aspects of the disclosed technologies. As shown, at least one sheet 10 is provided (actually a stack of sheets 10 are shown) that can be delivered for scanning and image transfer or printing as indicated above. In the exemplary embodiment shown, a sheet feeder 5 is provided to convey the sheets 10 along a process direction P of the one or more belts 8 or other sheet conveying mechanism. Throughout the system, various sensors S are shown which can determine different aspects with regard to sheet handling. Also, as part of the system various sets of sheet handling Nips N are provided for conveying the sheets through the system. The sheets 10 are then directed to a transfer station 50 where an image can be secured to the sheet 10. As with contemporary image transfer assemblies, the system can include a controller 52, print engine 54, image transfer drum 56, fuser 58 as well as other elements. However, it should be understood that other marking devices, such as an inkjet assembly, could be used to print an image onto the sheet(s). Also, the belt 8 or conveying system for handling the sheets 10 can be designed to automatically convey the sheets 10 through the transfer station 50 one or more times. Such a system can be provided with a sheet inverter 62 which can flip the sheet for duplex printing or image sensing.

Another aspect of the disclosed technologies is that the system includes one or more image sensing devices 60. FIG. 7 includes three different locations for one or more in-line image sensing devices 60. Alternatively, an image sensing device 60 can be provided as a separate apparatus, the output from which is fed to a transfer station controller 52 or to the transfer station 50 by other means. In other words, such a scanning device 60 need not be included in-line along the process path P. As illustrated, the image sensing device 60 can be located before (on the left side as shown in FIG. 7), within or after (on the right side as shown in FIG. 7) the transfer station 50. However, such a scanner 60 could be disposed at one or more different locations within or outside the illustrated paper handling process P.

In accordance with the embodiments herein, a sheet of paper 10 can be conveyed in the process direction P through the transfer station once and be looped back around in a clockwise direction along the belt system 8 so that it returns to the transfer station 50 once again. On the first pass the sheet receives a first image (the preliminary image). On the second pass, the sheet can be scanned by an in-line optical scanner 60 so that the adjusted second image can be secured to the sheet. It should be noted that while two opposed optical scanners 60 are shown at all location in FIG. 7, only one scanner can be provided, such as the top surface scanning device. Alternatively, scanning devices can be provided from both sides (as shown) so that both sides of the sheet can be scanned. It should be understood that where image sensing devices are provided on both sides of the sheet path P, they need not be directly opposed from one another.

Alternatively for duplex printing, in the first pass the sheet can receive the first image, in the second pass the sheet can be conveyed to the inverter 62 and conveyed back through the transfer station again along the loop in a clockwise direction as was done for the first side of the sheet in order to receive the third image onto the same sheet. Then a third pass will scan side 2 before being inverted for a fourth pass to scan side 1. Thereafter, with image adjustments having been made to the second and fourth images, subsequent sheets can loop twice through the system to receive the adjusted images before being transferred to the next station 400. It should be understood that the number of passes or loops through the system could be reduced by using/including image sensing devices on opposed sides of the sheet path P, thus eliminating the need to invert the sheet just for scanning. Similarly, the number of loops can be reduced by providing more than one print engine or at least more than one transfer station. Thus, while the various techniques of measurement and image location control described herein can be achieved with the same sheet being passed multiple times through the system, many of the same principals can be applied to a printing apparatus in which a sheet, even at the same side of the sheet, is caused to pass through multiple marking/transfer devices. For example, in a color printing apparatus different colors could be applied at different stations. Although a common controller can be used, multiple controllers should be provided with some means to communicate input and/or output in order to coordinate the process. Additionally, it should be understood that while the methods herein are primarily described with regard to performing image sensing on a single sheet, increased accuracy through averaging can be achieved by performing such image sensing on many sheets.

A controller 52 is used to receive sheet and image information from the sensors S, scanner 60 and any other available input devices that can provide useful information regarding the sheet(s) and/or image being handled or transferred in the system. The controller 52 can include one or more processing devices capable of individually or collectively receiving signals from input devices, outputting signals to control devices and processing those signals in accordance with a rules-based set of instructions. The controller 52 can then transmit signals to one or more actuation systems, print engines 54, or other handling devices. Thus, based on the orientation of the images relative to the sheet, as input to the controller, calculation can be made to properly register and/or scale images on the sheet.

Often media handling assembly, and particularly printing systems, include more than one module or station. Accordingly, more than one registration system as disclosed herein can be included in an overall media handling assembly. Further, it should be understood that in a modular system or a system that includes more than one registration system, in accordance with the disclosed technologies herein, could detect characteristics of the image or sheet and relay that information to a central processor for controlling registration in the overall media handling assembly. Thus, if further image processing or additional images are to be transferred to a sheet, then this can be achieved with the use one or more subsequent downstream registration systems, for example in another module or station.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An in-line method of adjusting the registration of an image printed on sheets in a marking device, wherein the sheets each include at least four separate corners defining a periphery thereof, each corner defined by two adjoining sheet edges, the method comprising:

determining in-line a first image location on at least one first sheet by measuring for each of at least three corners of each first sheet the distance between the two adjoining edges of the respective at least three first sheet corners to a portion of at least one first printed fiducial mark, the measurement obtained from an at least one image sensing device, wherein for each of the at least three first sheet corners the measured portion of the at least one first printed fiducial mark is closer to that respective corner than any other of the first sheet corners;

adjusting a second image to be printed by changing, relative to at least one second sheet, at least one of a size, shear, position and orientation of the second image based on the determined first image location;

printing the adjusted second image to the at least one second sheet;

determining a third image location on a second side of the at least one first sheet by measuring for each of at least three corners of the second sheet the distance between the two adjoining edges of the respective at least three first sheet corners to a portion of at least one second printed fiducial mark, the measurement obtained from the image sensing device, wherein for each of the at least three first sheet corners the measured portion of the at least one second printed fiducial mark is closer to that respective corner than any other of the first sheet corners;

adjusting a fourth image to be printed by changing, relative to a second side of the at least one second sheet, at least one of a size, position and orientation of the fourth image based on the determined third image location; and printing the adjusted fourth image to the second side of the at least one second sheet.

2. The method of claim 1, wherein the adjustment of the second image includes centering the second image on the at least one second sheet.

3. The method of claim 1, wherein the adjustment of the second image includes positioning the second image on the second sheet relative to at least one of the second sheet corners.

4. The method of claim 1, wherein the adjustment of the second image includes scaling the second image to fit predefined margins of the second sheet.

5. The method of claim 1, further comprising:
printing the first image to the first sheet before determining the first image location.

6. The method of claim 1, wherein the adjustment of the fourth image includes scaling the fourth image to match the size of the adjusted second image after it is secured to the at least one second sheet.

7. The method of claim 1, wherein the at least one first printed fiducial mark includes more than one first printed fiducial mark, wherein each of the more than one first printed fiducial marks is spaced apart from each other.

8. The method of claim 7, wherein each of the more than one first printed fiducial marks is closest to a different corner of the second sheet.

9. The method of claim 1, wherein the at least one first printed fiducial mark includes one continuous fiducial mark, wherein different portions of the one continuous fiducial mark are used to determine the first image location.

10. A system for adjusting the registration of an image printed on sheets in a marking device, wherein the sheets each include at least four separate corners defining a periphery thereof, each corner defined by two adjoining sheet edges, the system comprising:

an at least one image sensing device determining a first image location on a first sheet by measuring for each of at least three corners of each first sheet the distance between the two adjoining edges of the respective at least three first sheet corners to a portion of at least one first fiducial mark, wherein for each of the at least three first sheet corners the measured portion of the at least one first fiducial mark is closer to that respective corner than any other of the first sheet corners;

a controller for adjusting a second image to be printed, the controller operatively coupled to the image sensing device, wherein the second image is adjusted by changing relative to a second sheet at least one of a size, shear, position and orientation of the second image based on the determined first image location; and at least one print engine for generating the adjusted second image, the print engine operatively coupled to the controller, wherein the adjusted second image is printed to at least one second sheet;

wherein said at least one image sensing device being in-line with said at least one print engine to allow for the determining of the first image location automatically in-line, wherein the image sensing device further determines a third image location on a second side of the at least one first sheet by measuring for each of at least three corners of each first sheet the distance between the two adjoining edges of the respective at least three first sheet corners to a portion of at least one second fiducial mark, wherein for each of the at least three first sheet corners the measured portion of the at least one second fiducial mark is closer to that respective corner than any other of the first sheet corners, wherein the controller adjusts a fourth image to be transferred by changing, relative to a second side of the second sheet, at least one of a size, shear, position and orientation of the fourth image based on the determined third image location, wherein the print engine generates the adjusted fourth image for printing to the second side of the second sheet.

11. The system of claim 10, wherein the adjustment of the second image includes centering the second image on the at least one second sheet.

12. The system of claim 10, wherein the adjustment of the second image includes positioning the second image on the second sheet relative to at least one of the second sheet corners.

13. The system of claim 10, wherein the adjustment of the second image includes scaling the second image to fit predefined margins of the second sheet.

14. The system of claim 10, wherein the print engine further generates the first image on the first sheet before the image sensing device determines the first image location.

15. The system of claim 10, wherein the adjustment of the fourth image includes scaling the fourth image to fit predefined margins of the second sheet.

16. The system of claim 10, wherein the at least one first fiducial mark includes more than one first fiducial mark, wherein each of the more than one first fiducial marks is spaced apart from each other.

17. The system of claim 11, wherein each of the more than one first fiducial marks is closest to a different corner of the second sheet.

18. The system of claim 10, wherein the at least one first fiducial mark includes one continuous fiducial mark, wherein different portions of the one continuous fiducial mark are used to determine the first image location.

* * * * *